US010742656B2

(12) United States Patent
Chow

(10) Patent No.: US 10,742,656 B2
(45) Date of Patent: *Aug. 11, 2020

(54) SYSTEM FOR DELIVERING MESSAGES SECURELY VIA THIRD-PARTY ACCOUNT

(71) Applicant: Edmond K. Chow, Hong Kong (HK)

(72) Inventor: Edmond K. Chow, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,513

(22) Filed: May 7, 2018

(65) Prior Publication Data

US 2018/0262506 A1 Sep. 13, 2018

Related U.S. Application Data

(66) Continuation of application No. 14/498,866, filed on Sep. 26, 2014, now Pat. No. 9,967,256, which is a continuation-in-part of application No. 13/269,553, filed on Oct. 7, 2011, now Pat. No. 8,881,268, Substitute for application No. 62/053,233, filed on Sep. 22, 2014.

(60) Provisional application No. 61/391,033, filed on Oct. 7, 2010.

(51) Int. Cl.
*H04L 29/06* (2006.01)
*H04L 12/58* (2006.01)
*G06F 21/62* (2013.01)

(52) U.S. Cl.
CPC .......... *H04L 63/10* (2013.01); *G06F 21/629* (2013.01); *H04L 51/046* (2013.01)

(58) Field of Classification Search
CPC ..... G06F 21/629; G06F 21/00; H04L 51/046; H04L 63/10
See application file for complete search history.

(56) References Cited

U.S. PATENT DOCUMENTS

| | | |
|---|---|---|
| 6,304,898 B1 | 10/2001 | Shiigi |
| 6,707,942 B1 | 3/2004 | Cortopassi et al. |
| 7,023,818 B1 | 4/2006 | Elliot |
| 2004/0233881 A1 | 11/2004 | Kang et al. |
| 2006/0083187 A1 | 4/2006 | Dekel |
| 2006/0286970 A1 | 12/2006 | Otobe et al. |
| 2007/0171910 A1 | 7/2007 | Kumar |
| 2011/0231494 A1 | 9/2011 | Pasquero et al. |

(Continued)

OTHER PUBLICATIONS

Kate et al. (Anonymity and Security in Delay Tolerant Networks, Mar. 26, 2007, 22 pages). (Year: 2007).*

(Continued)

*Primary Examiner* — Oleg Korsak

(57) ABSTRACT

Privacy and restricted access are provided for functions, applications, and services available on a computing device. An area accessible to a user interface is provided. A request from a user of the device is accepted, the request for associating the area with one or more available functions. The one or more functions are then associated with the area, and are made invisible. Another request from the user is accepted, the other request for gaining access to the area. Authentication against the user is requested. Access to the one or more functions is granted if the authentication is successful. According to another embodiment, an authorized user may send and receive messages via another device that belongs to another user based on identification of the user by the other user.

20 Claims, 10 Drawing Sheets

(56) References Cited

U.S. PATENT DOCUMENTS

2014/0213306 A1    7/2014   Blankenship et al.
2014/0250204 A1    9/2014   Shalunov et al.

OTHER PUBLICATIONS

Nishiyama et al., (Relay-by-Smartphone: Realizing Multihop Device-to-Device Communications, IEEE Communications Magazine o Apr. 2014, pp. 56-65).
Raka Sen, (What Your Favorite Font Says About You, p. 2, Sep. 5, 2013, 17 pages).
Santos et al. (My-Direct: A Middleware for P2P Mobile Social Networks, (IJCNC) vol. 6, No. 3, May 2014, pp. 177-196).

* cited by examiner

US 10,742,656 B2

SYSTEM FOR DELIVERING MESSAGES SECURELY VIA THIRD-PARTY ACCOUNT

CROSS REFERENCE TO RELATED APPLICATIONS

The present application is a continuation of U.S. patent application Ser. No. 14/498,866, filed Sep. 26, 2014, which claims benefit under 35 U.S.C. § 119(e) of provisional U.S. patent application No. 62/053,233, filed Sep. 22, 2014, and is a continuation-in-part of Ser. No. 13/269,553, filed Oct. 7, 2011 (issued as U.S. Pat. No. 8,881,268), which claims benefit under 35 U.S.C. § 119(e) of provisional U.S. patent application No. 61/391,033, filed Oct. 7, 2010. Content of all of the above applications is incorporated herein by reference in its entirety.

TECHNICAL FIELD

The present invention relates to systems, methods, processes, and products of access control to resources available on a computing device. In particular, it provides privacy and restricted access to functions available on a computing device.

BACKGROUND

A computing apparatus or device may be equipped with a means to authenticate a user for access. However, there may be applications or functions (herein referred to as apps) on the device that a user would access or use often but not wanting the need for device-level authentication every time he wishes to do so. On the other hand, some apps may provide their own authentication (optional or otherwise), so that a user may disable authentication for the device, and rely on such app-specific authentication. In this case, the user needs to be authenticated individually by these apps, and manage the credentials (e.g., user name and password) for all these apps. In addition, when a device communicatively coupled to a user lacks network connectivity, the user who is using the same online service as another user would not be able to access the service, even though a device of the other user has network connectivity to communicate with the service and the device of the user is communicatively linked to the device of the other user.

SUMMARY

According to one embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful. According to another embodiment, an authorized user may send and receive messages via another device that belongs to another user based on identification of the user by the other user.

OBJECTS AND ADVANTAGES

Embodiments of the present invention provide access control to a collection of apps, and access to them needs not be individually authenticated. These apps may also be made invisible or opaque for privacy purposes. Different levels of app availability may also be made available so that only a subset of apps is visible and accessible to a user. For example, one level may be configured to make visible and accessible apps intended for children, while hiding other apps.

DETAILED DESCRIPTION OF ILLUSTRATIVE EMBODIMENTS

Disclosed are methods, systems, and devices for restricting access to one or more apps on a device. For instance, a method for restricting access to one or more apps and their data is described, the method comprising providing an area; accepting a request to associate one or more functions with the area; associating the one or more functions with the area; accepting a request for access to the area; requesting for authentication; providing access to the one or more functions, if the authentication is successful; and denying access to the one or more functions, if the authentication is not successful. According to another embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful.

Figure 1:
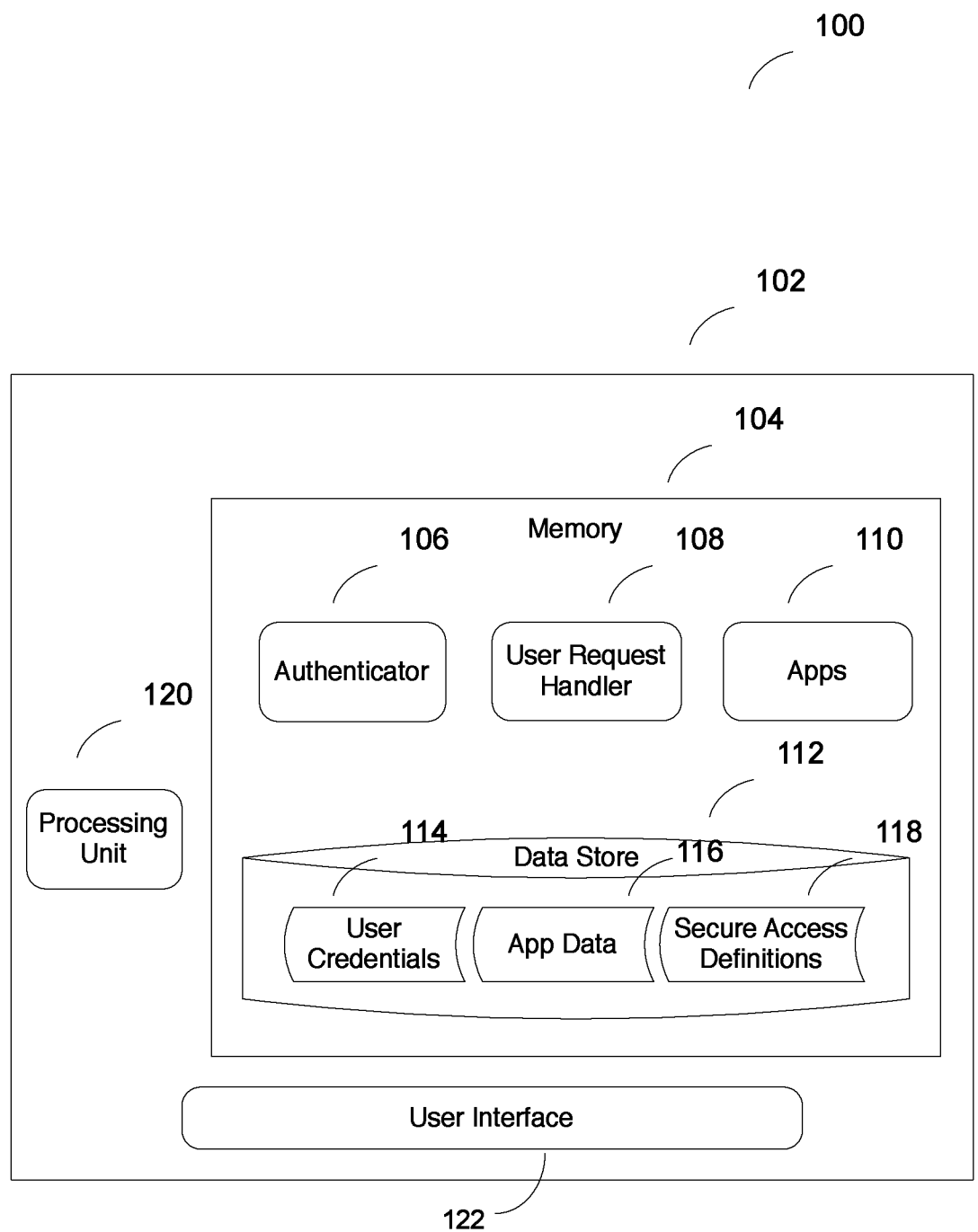
FIG. 1 shows a block diagram of a device in accordance with an embodiment.

FIG. 1 shows a block diagram 100 of an exemplary device 102 equipped with the present invention. The device 102 comprises a processing unit 120, a memory 104, and a user interface 122. The device 102 (e.g., a mobile phone, personal digital assistant, computing tablet, desktop phone, a portable or desktop computer, a control terminal, and so on) is communicatively coupled to a user via the user interface 122 (e.g., a display, a speaker, a microphone, a keyboard, a touch screen, and so on). Any type of user interface is within the scope of various embodiments.

The user interface 122 is provided for interacting with a user, including receiving requests for designating an app for restricted access and accessing the app or a restricted area, view or screen in or with which the app is protected or associated, as well as indications that another user or a device of another user may access applications or services on the device.

The memory 104 is provided for storing programs and data for the operation of the device 102. It includes an authenticator 106, a user request handler 108, one or more apps 110, and a data store 112, the data store comprising user credentials 114, app data 106, and secure access definitions 118. The user request handler 108 is responsible for interpreting requests sent by a user via the user interface 122, such as associating apps with a secure or restricted area, assigning apps to a secure or restricted area, view or screen, deciding if authentication is required in relation to accessing the secure or restricted area so to run or make visible the one or more apps and their data installed or otherwise accessible through the device, and communicating with the one or more apps 110 about requests from one or more users, the requests for granting access to the one or more apps 110 on the device 102 to one or more devices associated with the one or more users. The authenticator 106 is responsible for prompting for and accepting input from the user, for example, to decide if a secure area comprising the apps in question should be made visible or available to the user, as well as other authentication-related activities, such as creating or changing user credentials. If the authentication is successful, the authenticator may then allow the requested operation or effect to proceed. Otherwise, the user is notified of such denial. The user credentials 114 in the data store 112 are used for such authentication purpose (e.g., as executed by the authenticator 106), while the secure access definitions 118 there provides the rules or boundaries under which an authentication is required. The app data 116 provides data storage for the one or more apps 110. The authenticator 106 may also facilitate identification and/or authentication of an external device or an application on an external device based on identification and/or authentication of the user of the application or the external device.

The processing unit 120 is provided for executing the programs (e.g., the authenticator 106, user request handler 108, and apps 110) in the memory 104, and the user interface 112 for interacting with a user.

In some embodiments, the secure access definitions 118 may be part of the user request handler 108, or the authenticator 106 may be part of the user request handler 108. As such, although the device 102 is described as being comprised of these various components, fewer or more components may comprise the device shown in FIG. 1, and still fall within the scope of various embodiments.

In one embodiment, a user via the user interface 122 selects an app for configuration (e.g., by touching and holding for a pre-determined period of time an icon for the app on a touch screen), and specifies that the app be associated with a secure area, such as a folder, a screen view or page, or a virtual screen available on the device. (E.g., the user may gesture to the device via screen scrolling that he wants to access to the next screen view or page to the right of the current screen view or page, or an out-of-sight virtual screen positioned virtually at the top of the current screen, the next screen view or page, or the out-of-sight virtual screen being designated or configured as a secure area.)

Such specification or association may be performed via a configuration file, settings page, or the selected icon (e.g., dragging the icon to the secure area). The user request handler 108 or its equivalent stores this configuration in the secure access definitions 118. If the user does not yet have credentials established for such authentication, then the user request handler 108 causes the authenticator 106 to prompt the user to establish one, and to handle the subsequent interaction with the user. Alternatively, the user request handler 108 may do so with the user via the user interface 112. Successfully established, the credentials are stored in the user credentials 114 in the data store 112. The user may also change the credentials via the authenticator 106 independent of any app invocation or configuration for access. If the user wishes to no longer restrict access to the app, then he may be first authenticated by the authenticator 106 before being granted the permission to make such change. (E.g., to disassociate an app with a secure area, the user may touch, hold, and drag the icon for the app in the secure area to outside.) The user request handler 108 updates the secure access definitions 118 accordingly.

Upon receiving a request from a user to access an area or screen through the user interface 112, the user request handler 108 checks if there is any applicable data in the secure access definitions 118 for the area or screen. If so, it causes the authenticator 106 to interact with the user and authenticate him against the data in the user credentials 114 in the data store 112. Otherwise, the area or screen may be accessible without further permission or credentials checking. Should the authentication in the former case be successful, the area or screen may be accessible, thereby making the apps therein available to the user.

In an embodiment, a touch-screen device presents a list, view or inventory of available apps on one or more visual pages or areas, where a user may go from one page or area to another. For example, a so-called home screen on the device may comprise more than one set of apps, where each set of apps is displayed or otherwise presented independently from the other sets. The user may gesture to the device (e.g., by swiping across the screen) to select the previous or next set or sets in relation to the current set of apps. Each set of apps so display or presented makes up a view, each of which may extend beyond what the physical screen of the device can show at any one point in time. For example, individual views may be organized horizontally while the icons of the apps vertically. Animations such as that of sliding from one page to the previous or next, either horizontally or vertically, may accompany this change of view. In addition, an secure area may change in size and/or color, for example, depending on the status of protection and the number of apps therein. The user interface 112 is responsible for such interaction with the user.

In one instance, the user indicates via the user interface 112 to the user request handler 108 that one view is configured to become a restricted area, in that access to it would require authentication of the user by the authenticator 106. Upon successful authentication, the user may access this restricted area or view, and assign apps to it (e.g., by moving their icons into the area or view), thereby removing these apps from authentication-free access at the app execution level even when the device-level authentication, if any, has been successfully performed or otherwise been disabled. That is, to gain access to apps with restricted access, the user needs to be authenticated by the authenticator 106. Successful authentication enables the user to access all apps in the restricted view or area for which the authentication is performed. Such authentication may be required every time access to the restricted area or view, or to the individual apps within it, is requested by the user, or when there is some inactivity of the device or apps in question since the last successful authentication. Or the user may open and close restricted areas or views manually via the user interface 112, so that the user request handler 108 may then decide in accordance to this manual setting if access to the restricted areas is granted and whether authentication is needed.

The user may also designate two or more sections of views, one or more of which comprising one or more restricted areas or views. Between any two sections may be a demarcation or partition point, line or interface (visible or otherwise), where authentication will be required if the user requests access to a section of restricted areas or views, and not required if he requests access to a section of non-restricted areas or views. Different sections of restricted areas or views may have different passwords or credentials for authentication. In addition, the same app with different data sets may also appear in different sections. For example, a phone app may appear in both the non-restricted and restricted areas, where the phone app in the restricted area has access to different contact data and call logs compared to the one in the non-restricted area. Another example app is a photo album app. That is, the data that an app may have access to defines the function of the app and distinguish it from the otherwise same app that does not have access to the data (but perhaps to other data). In one embodiment, a Secure Access Definition such as the one shown in FIG. 1 stores and maintains the relationships between the apps and their respective data in relation to the sections that they are applicable to. For instance, the user may specify an email address for which messages received will be associated with an email app in a section of restricted areas, while messages received for all other email addresses will be associated with an email app in another section.

Figure 2:
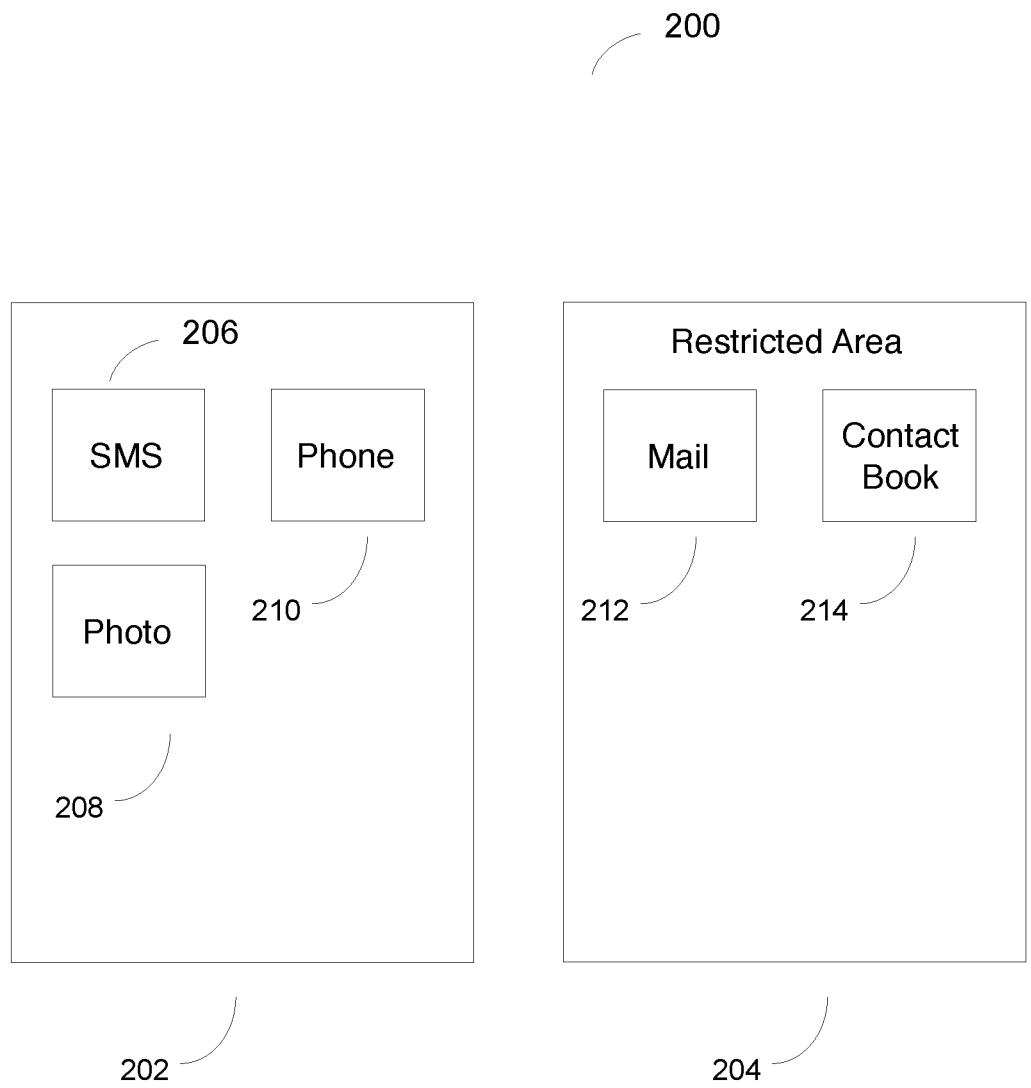
FIG. 2 shows screenshots on a device in accordance with an embodiment.

FIG. 2 shows an exemplary display 200 of screen that may be presented on a device embodying the one depicted in FIG. 1. There are two screen shots 202, 204, each representing an area or view of apps or their icons. The one on the right is a restricted area whereas the on the left is not. As such, the left screen, area or view will be accessible to the user without the need for authentication, while the data associated with the apps whose icons appearing in this screen, area, or view (i.e., SMS 206, Phone 210, and Photo 208) are available to the user also without any authentication. On the other hand, since the right screen, area, or view is restricted, a user will not gain access or visibility to it until successful authentication. As such, the apps (i.e., Mail 212 and Contact Book 214) in this screen, area, or view will be protected from unauthorized access. The data associated with these apps are likewise unavailable to the user or other apps that the user may be using or capable of invoking without authentication.

Figure 3:
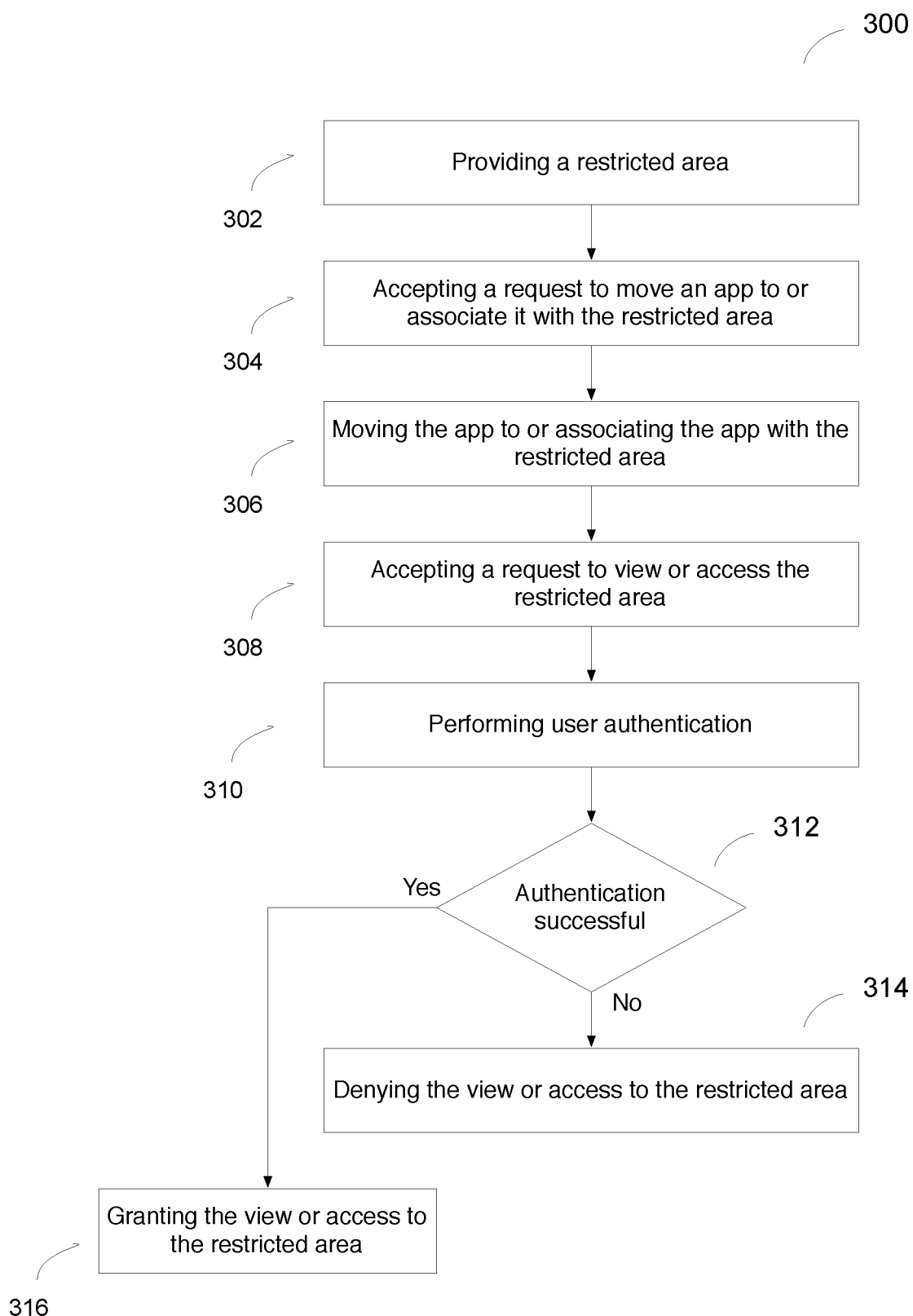
FIG. 3 shows a first computerized method in accordance with an embodiment.

FIG. 3 shows a flow diagram of an exemplary process 300 for configuring an app for authentication on a device, such as the one shown in FIG. 1, with a display or screen an example of which is depicted in FIG. 2. For instance, per the example process 300, the user interface 122 provides a restricted area, view or screen (302), which may be disabled, enabled or otherwise configurable by the user. If there are no user credentials available yet, the user request handler 108 will cause the authenticator 106 to interact with the user via the user interface 122, so to obtain them, before the restricted area, view or screen may be activated, enabled or otherwise created. (In one embodiment, the user password for the device, if available, will be used as the initial user credentials for restricted areas, views, or screens.) The authenticator 106 (or in some embodiments, the user request handler 108) will store the information in the user credentials in the data store. The user request handler 108 accepts a request via the user interface 122 to move an app to or otherwise associate it with the restricted area (304), such as having the user pressing, holding and dragging the app icon from an unrestricted area, view or screen, to the restricted one. The handler 108 causes the user interface to remove the app icon from the unrestricted area to the restricted one (306), and stores in the secure access definitions 118 this membership in or association with the restricted area, view or screen. (Such setting in the secure access definitions 118, for example, may cause the data maintained by or otherwise associated with the app to become unavailable to other apps that may otherwise have access to them, such as the data in Contact Book app being available to the Phone app.) Then the user request handler 108 receives a request from the user via the user interface (e.g., by gesturing the intent to access the restricted area from the unrestricted one, such as those shown in FIG. 2) to access the restricted area (308). The handler causes the authenticator to request user credentials (e.g., password) or otherwise authenticate with the user (310). If the authentication is successful (312), then the authenticator causes the user request handler to make visible or otherwise accessible the restricted area to the user via the user interface (316), thereby enabling access to the apps therein, as well as making available the data of these apps to other apps. Otherwise, the secured area access request is denied (314).

Figure 4:
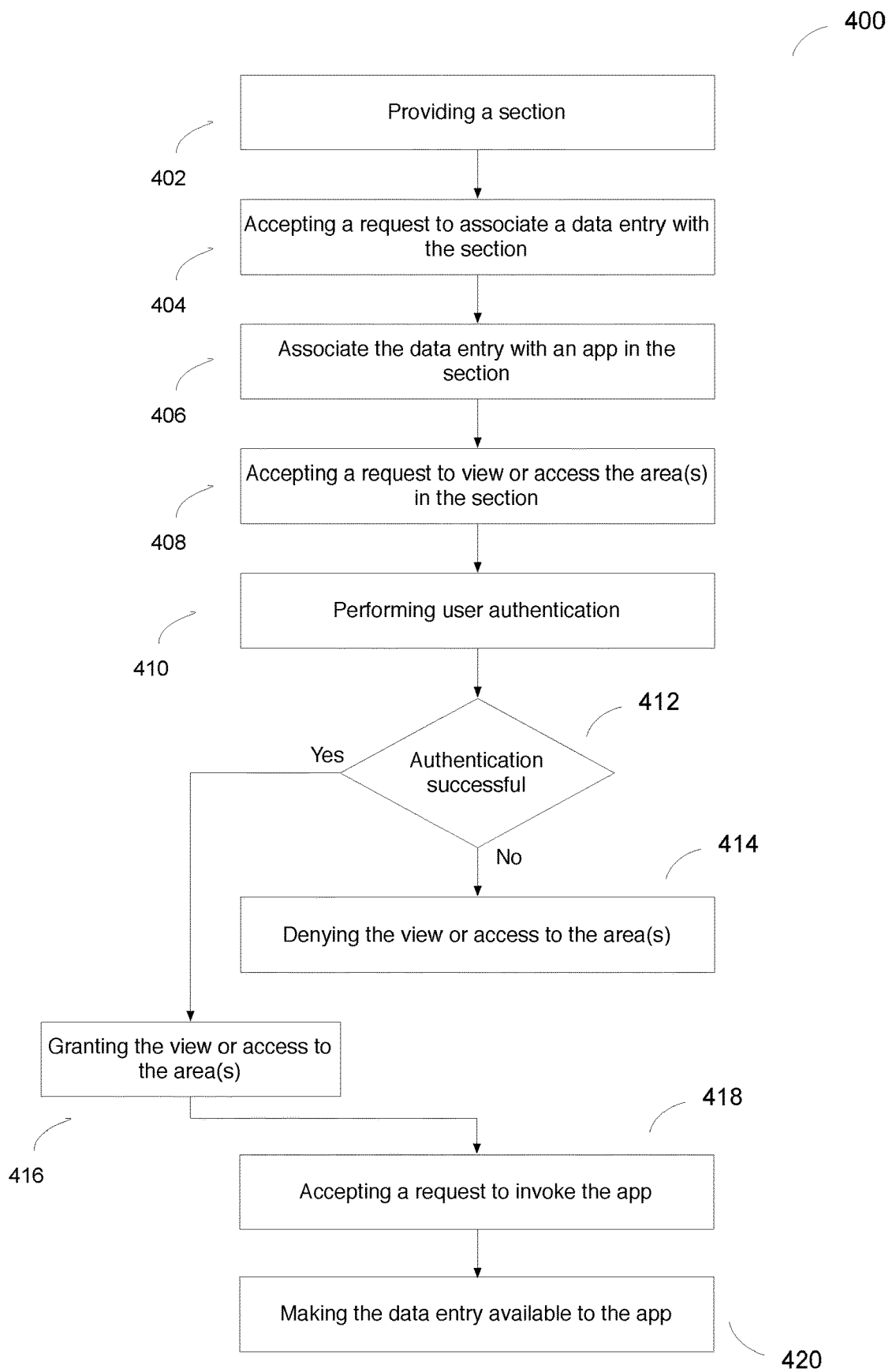
FIG. 4 shows a second computerized method in accordance with an embodiment.

FIG. 4 shows a flow diagram of an exemplary process 400 for assigning a data entry (e.g., a contact entry, a photo, an email address) to a section of restricted areas available on a device, such as the one shown in FIG. 1. For instance, per the example process 400, the user interface 122 provides a section of restricted areas, views or screens (402). It accepts from a user a request to associate a data entry with the section (404). The User Request Handler 108 identifies one or more apps that can handle the type of the data entry or are otherwise associated with the type, and associates the data entry with the one or more apps (406). It stores this association information in Secure Access Definitions 118. The User Interface 112 accepts a request to view or access a restricted area in the section (408). The Authenticator performs user authentication (410). If successful (412), it grants access to the area (416); otherwise it denies the access (414). When the User Request Handler 108 accepts a request to invoke one of the one or more apps in the area upon successful authentication (418), it makes available the data entry or data related to the data entry to the invoked app (420).

The embodiments as described above enables a user to restrict access to an app that may not have any authentication capability itself, without the need for the device-wide authentication. For example, a parent may create a secure visual area, and place a phone app in that area, so that his kids cannot access the app without successful authentication. Or he may place a video browsing app or a Web browser in the secure area, which only requires authentication outside a certain period during a day, given that access to the date setting function for the device is also restricted. In the other words, an embodiment of the present invention enables a user to organize and manage invocation or execution-level authentication for a group of apps collectively even when the apps are not capable of doing so.

In some embodiments, data from restricted apps may not be visible or accessible to apps whose access is otherwise unrestricted. For example, if a contact book app is restricted while a phone app is not, then the phone app although functional (e.g., for making calls) cannot access to the data provided or otherwise maintained by the contact book app, and history information that the phone app may maintain should hide or otherwise omit entries that are derived from or otherwise related to the data of the contact book app.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on computer readable media, the logic configured to perform methods of the invention. The examples provided herein are exemplary and are not meant to be exclusive.

In addition, a service or application available on a user device may be made accessible to a compatible service or application on another user device for purposes of relaying a message or data sent by or addressed to a user on the other user device. For example, a user of a service (e.g., an electronic messaging service provided by one or more computing systems comprising a messaging system and a user device) may indicate to the service (e.g., via an application associated with the service where the application is running on a device of the user) that another user of the service is authorized to use a device of the user to relay, send, or receive messages or data sent by or addressed to the other user. This authorized access to such functions or capabilities on a device of the user is limited to a device of the other user whose user identity can be authenticated or otherwise ascertained.

Figure 5:
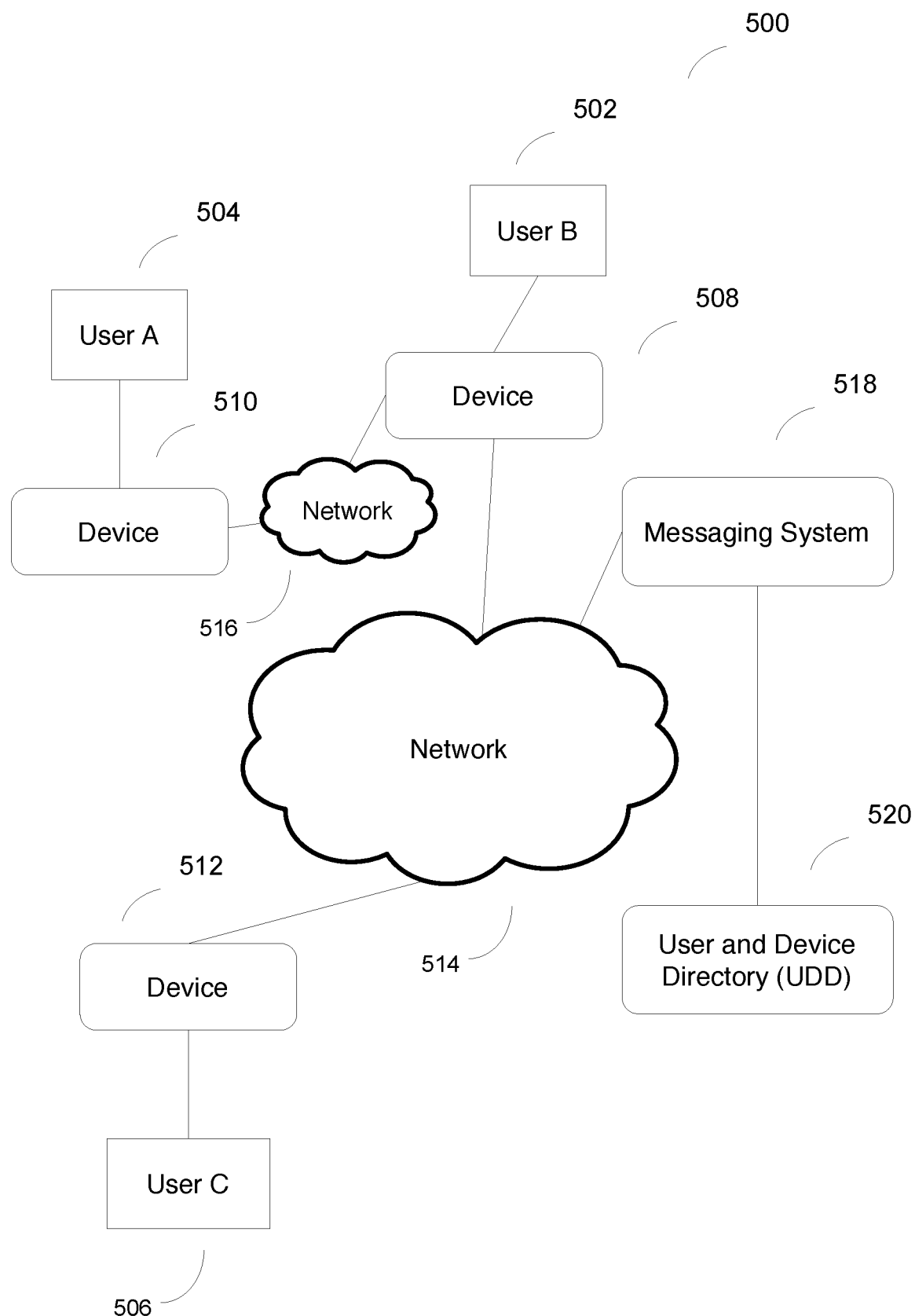
FIG. 5 shows an example environment in accordance with an embodiment.

For instance, FIG. 5 illustrates an exemplary environment 500, according to an embodiment, for enabling a device 510 of User A 504 to make use of a device 508 of User B 502 to send and receive messages or data to and from User C 506, when a network 514 (e.g., the Internet) through which User C, his device 512, or a messaging system 518 can be reached is unavailable to the device 510 of User A. For example, the device 510 of User A may be communicatively connected or linked to, or otherwise reachable by the device 508 of User B via another network 516, e.g., a Bluetooth connection or a Wi-Fi network in non-infrastructure mode. Any type, mode or form of presence discovery and data transfer among devices is within the scope of the present invention, such as those utilizing near-field communication (NFC), Bluetooth, and Wi-Fi, or a peer-to-peer connectivity protocol or system.

As part of a signup process or user account configuration for the service, User B 502 may specify or otherwise indicate to the messaging system 518 that User A 504 is permitted to receive and/or send messages (or data) through a user account of User B or a device associated with User B 502. In one embodiment, User A may also indicate to the messaging system 518 that messages sent by or addressed to him may be relayed through a device of User B. In one embodiment, such a permission or authorization in itself neither allows User A 504 to interact directly with a device of User B, nor enables User B 502 to gain visibility or access to these messages.

In one embodiment, when the messaging system 518 receives a message addressed to User A, for example, received from the device 512 of User C, it determines if a device of User A is available (e.g., by not receiving a periodic poll from an application or device associated with User A 504, or by sending asynchronously or unilaterally such as via WebSocket a notification to an application or device associated with User A 504). Should a device of User A be deemed unreachable, the messaging system 518 may identify a device of another user, e.g., by consulting with a user and device directory (UDD) 520, which, in one embodiment, is a database system that maintains information on one or more devices that are associated with each user of the service, and information on one or more users who are permitted to use devices associated with a particular user for relaying messages. In relation to that User A 504 is permitted to use devices associated with User B 502 and that the device 508 is associated with User B 502, the messaging system 518 may deliver the message whose sender is User C 506 to the device 508 of User B, which forwards or otherwise sends it to the device 510 of User A for presentation to User A 510 or consumption by a compatible application associated with User A 510. In one embodiment, the device 508 of User B or the application receiving the message on the device does not disclose the message to User B 502. In another embodiment, the device 508 of User B or the application receiving the message may disclose the information in the message and any attachments or media associated with the message to User B 502 when User B 502 is also a recipient of the message. This mechanism or arrangement may save or otherwise reduce data usage of transmission or transfer bandwidth through the network 514 with respect to User A 504 and User B 502 together, as it would otherwise take two payloads of similar size and format to deliver the content in the message to two users of the service.

Whereas an application on a device should reject or would otherwise not receive a message addressed to users that do not have an account with the application running on the device, an application in one embodiment may accept such a message and identify these recipients. The application may maintain a local list of users that User B 502 has authorized their associated devices to receive and send messages via his device 508, and it may obtain, receive, or update such a list of users at the messaging system 518 (which may store and maintain this information at UDD 520). In one embodiment, these users also agree to use a device associated with User B 502, such as the device 506 of User B, to relay their messages to and from their individual devices.

In one embodiment, while a device such as the device 510 of User A 504 may maintain its own list of authorized users, the messaging system 518, in connection with UDD 520, may provide and maintain a service or system-wide database for such information for all users of the service. For example, when a messaging application on the device 510 of User A detects that there is no connectivity or communication path at the device to the network 514 (e.g., the Internet) that would have enabled its messages or data to reach the messaging system 518, it searches for connectivity to other devices that may reach the messaging system 518, where these other devices may have a compatible message application running thereon. For example, in one embodiment, the messaging application may detect presence of another device through the network 516 (or via a means of connectivity not necessarily regarded as a network, such as NFC) and exchange user identity information with the compatible messaging application on the other device. In one embodiment, the compatible messaging application may send the user identity information about User B 502 to the messaging application on the device 510 for presentation to User A 504, who may then, for example, confirm the identity of User B 502 and trust the device 508 of User B to relay his messages.

In another embodiment, the compatible messaging application may request user identity information about User A 504 for presentation to User B 502 who may then, for example, permit the device 508 of User B to relay messages for the device 510 of User A.

In one embodiment, User A 504 may interact with his messaging application on his device 510 so to indicate via the device 502 of User B to the messaging system 518 that the device 508 of User B or the compatible messaging application on the device 508 of User B is allowed to receive and send messages on behalf of User A 504. For instance, User A 504 may authorize the sending by his device 510 to the device 508 of User B 502 of a code or token uniquely identifying User A 504 to the messaging system 518, or any messaging service-specific identification information about User A 504 that cannot easily be tempered with by User B 502 or other users. In one embodiment, such identity information or credential may be one-time use. In another embodiment, such identity information or credential may be exchanged securely between the two devices or the two applications on these devices. In one embodiment, the device 508 of User B may use this identity information about User A 504 to register with the messaging system 518 over the network 514 that messages addressed to User B may now be sent to the device 508 of User B, and that messages whose sender is User A 504 may now come from the device 508 of User B. While the application on the device 508 of User B may handle these messages, it may not allow access to them to User B 502. In another embodiment, User B 502 may have access to content contained in such messages if he is also a recipient of the messages.

In one embodiment, the information provided to the messaging system 518 for assigning or otherwise associating the device 508 of User B as a message relaying means to the device 510 of User A may comprise identification information of User A 504, the device 510 of User A, User B 502, and the device 508 of User B. In another embodiment, identification information of User A 504 may be derived or otherwise looked up, e.g., by the messaging system 518, via identification information of the device 510 of User A, or vice versa. Likewise, identification information of User B 502 may be derived or otherwise looked up via identification information of the device 508 of User B, or vice versa. In one embodiment, each piece of such information may be provided by its respective device to the messaging system 518. In another embodiment, each piece of such information may be first collected by the other device that may then forward it to the messaging system 518.

Any mode, form, or mean of user identification and authentication as well as resource authorization, such as adopting or adapting an OAuth protocol for granting access to select resources (e.g., messages addressed to User A 504) to a third party (e.g., the device 506 of User B), is within the scope of various embodiments of the present invention.

In one embodiment, a compatible application, which may be running as a background service or in an active mode on the device 508 of User B, may report to the messaging system 518 that a device associated with User A 504, such as the device 510 of User A, is communicatively coupled, linked, or otherwise associated with the application, and that the device associated with User A requests the messaging system 518 to send from now on to the device 508 of User B those messages addressed to User A 504, and to receive messages whose sender is User A 504 from the device 506 of User B. In one embodiment, such a message relaying setup or arrangement can be manually requested by either User A 504 or User B 502, or either user device based on some calendar time information or a timer.

In one embodiment, when the compatible application on the device 508 of User B receives a message addressed to User A, it may send it to the device 510 of User A, for example, via the network 516 from the messaging system 518, for presentation to User A 504. In another embodiment, when the compatible application on the device 508 of User B receives from the device 510 of User A a message whose sender is User A with, for example, User C 506 as recipient, it may send it to the messaging system 518 via, for example, the network 514. The messaging system 518 may then forward it to the device 512 of User C for presentation to User C 506. In one embodiment, such an application may belong to a secure area. Identities of users whose device may be granted access to the application may also be associated with the secure area.

In one embodiment, the device 508 of User B (namely, the relaying device) may receive or continue to receive messages addressed to User A while the device 510 of User A (namely, the relayed device) is unreachable to the relaying device, whether temporarily or otherwise. When later the reachability is established, the relaying device may then forward those messages to the relayed device. In one embodiment, this message storing and forwarding relationship between these two devices is one to one, and can be made temporary, e.g., the relaying device not being a server configured to receive and store messages for a user (e.g., User A 504) without the need of consent from another user (e.g., User B 502).

In one embodiment, the relayed device may establish or restore connection or connectivity with the messaging system 518 over the network 514. Such establishment or restoration may be detected by the relayed device, the relaying device, and/or the messaging system 518, and made known to the messaging system 518, so the messaging system may choose a desirable communication path (e.g., over the network 514 or via the relaying device) to deliver the next messages. In one embodiment, the relayed device may receive duplicate messages that may come from different networks 516, 514. The application receiving these messages on the relayed device may remove the duplicate messages from presentation to its user (e.g., User A 504) based on, for example, a message identifier or some sequence number that is unique across messages, whether alone or in combination with other readily available information, such as time information.

Unlike technologies that enable multiple devices to share a network connection or to work together to bridge different payload protocols, such as peer-to-peer mobile internet connection sharing or tunneling protocols, a particular embodiment would make it possible for a device to receive a message or data addressed to another user of a common or compatible application running on the device, and forward or otherwise relay the message or data to another device communicatively coupled to the other user, where the application or another instance of the application is also running on the other device. The other device may also send messages or data via the device where the other user is a sender of the messages or data, and the user is not a recipient. The selection of or permission for this communicative channel, path, or link between the device (or the application on the device) and the other device (or the application on the other device) for receiving and sending user messages or data is based on user identity and consent.

Figure 6:
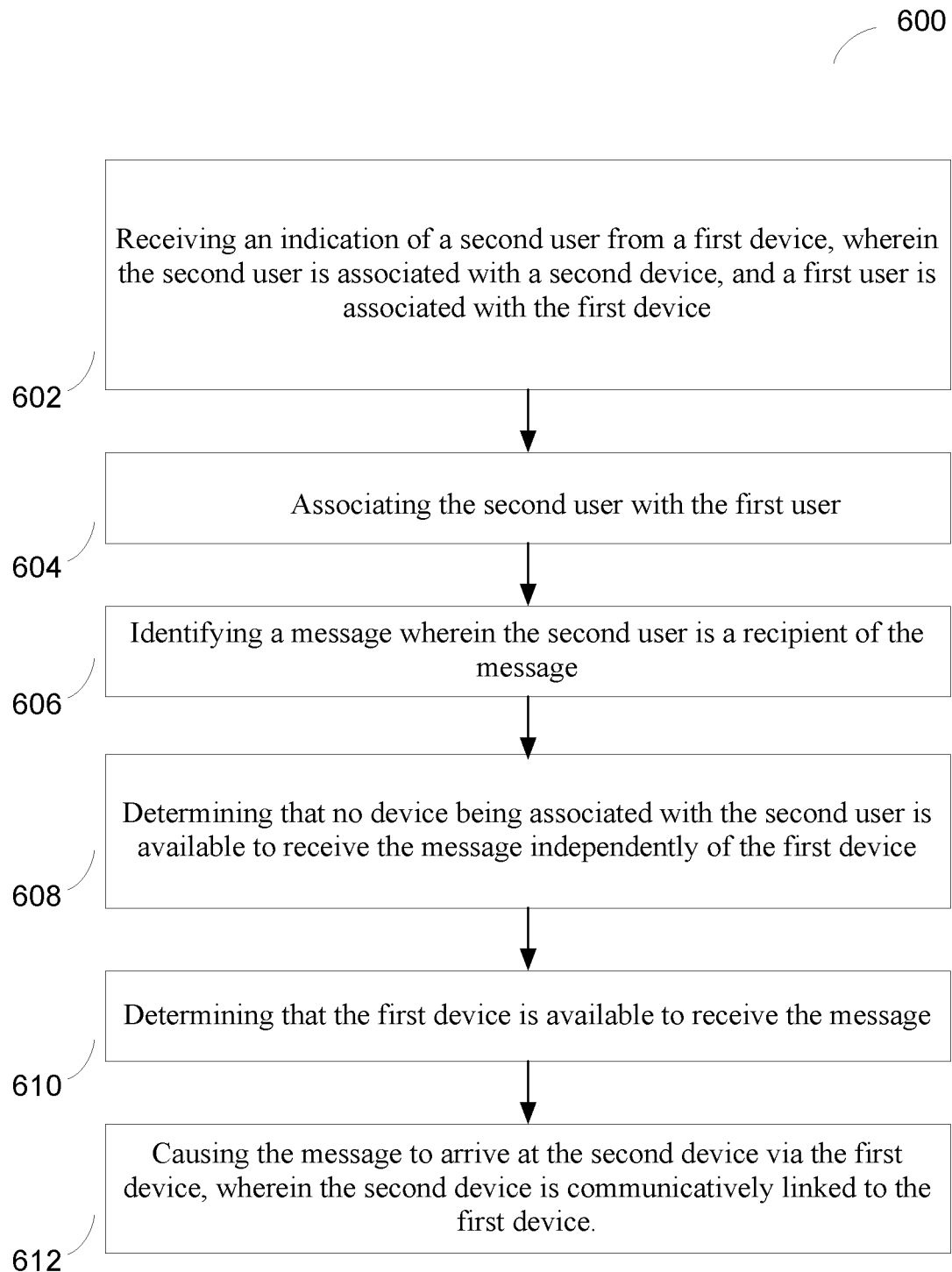
FIG. 6 shows a fourth computerized method in accordance with an embodiment.

FIG. 6 shows a flow diagram of an exemplary process 600 for relaying a message to a user through an intermediary device of another user where, for example, the process or the steps as described may be performed under the control of one or more computing systems of a service, such as a real-time messaging service for text and multimedia. A computer system may be configured with executable instructions and may comprise a device local to a user, such as a mobile phone, and a device non-local to a user, such as a messaging system. Per the example process 600, the computer system may receive from a device an indication of another user, such as an identification of the other user, where the device is associated with a user (e.g., an application with the user logged on is running on the device), the other user has access to a device that was, is, or will be known to the computer system, and the device is communicatively connected to the computer system over a network (602). In one embodiment, the indication of the other user may include identification information that is inaccessible to or un-modifiable by the user and may originate from the other device or from the other user. In another embodiment, the two users may have their own accounts with the computer system or the service, and each user cannot access the account information of another user unless he obtains the logon credential of the account.

The computer system may then associate the other user with the user (604), for example, for alternative message delivery paths, should the device of the other user become unreachable. For instance, the computer system may receive an incoming message whose recipients include the other user, or identify an outgoing message in a database or another device (e.g., a server), the message having the other user as recipient (606). In one embodiment, the computer system may receive an indication of the user from the other user or a device associated with the other user, so to permit a device of the user to relay messages addressed to the other user or whose sender includes the other user. In another embodiment, such a message may be specific to or otherwise associated with an application or a type of application that is configured to receive or send the message or messages of similar type. In one embodiment, a device in the computer system, such as a mobile phone of the user or the other user, may receive an indication of a user and present it to the user of the other use for acknowledgment or confirmation so to grant the association of the device with another device associated with the indicated user, for the purpose of relaying messages, e.g., the device being a message relayed device or a message relaying device.

The computer system may detect that there is no device that is reachable and has the other user logged on an applicable program running on the device (608). In one embodiment, the computer system may detect that there is no device that has an applicable program or application running with the other user logged on, where the program or application is configured to receive or send the message or messages of similar type.

In relation to the association of the other user with the user, it may locate or otherwise identify a device that is reachable (610). In one embodiment, the computer system may locate or otherwise identify in a database a device that has an applicable program running with the user logged on.

The computer system may then send the message to the applicable program running on the device of the user, which may in turn send via a communications link, channel, or path, the message to the applicable program on the device of the other user, for example, for presentation to the other user (612). In one embodiment, the message may be stored in a third device, from which the computer system may cause the message to be delivered from the third device to the device of the user, and then from the device of the user to the device of the other user. A compatible program or application, for example, may run on the device of the user and the device of the other user to receive and/or send the message, and is associated with its respective user who is deemed to have logged on the program or application, where the user or the other user may change to another device running another compatible program or application. In one embodiment, the computer system may then cause delivery of the message to or from the other device automatically upon determining that the user or other user is deemed to have logged on the other compatible program or application.

Figure 7:
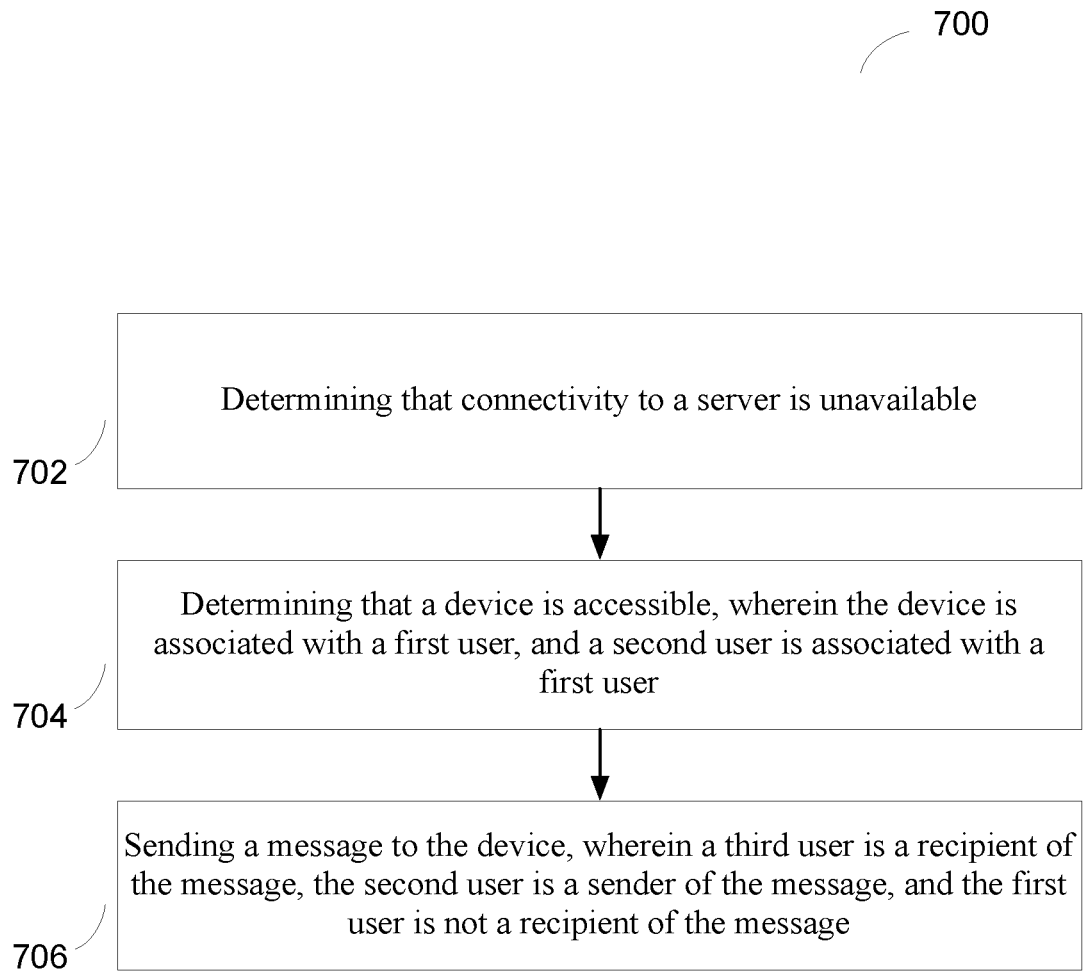
FIG. 7 shows a fifth computerized method in accordance with an embodiment.

In one embodiment, a message-relayed device may detect a message-relaying device and send a message through the latter when it loses communication to the messaging system, or connectivity to the network that may enable it to reach the messaging system. For instance, in accordance with one embodiment, FIG. 7 shows a flow diagram of an exemplary process 700 for sending a message through a message-relaying device. A computer system may be configured with executable instructions and may comprise a device local to a user, such as a mobile phone, and/or a device non-local to a user, such as another mobile phone local to another user. Per the example process 700, the computer system may determine that connectivity to a network or a server, e.g., a message system, is no longer available (702). The computer system may then detect a device that it may reach (e.g., a nearby device that can be connected via a peer-to-peer connectivity or protocol), and that the device belongs to a user that the user of the computer system trusts, or is otherwise associated with an authenticated user that he trusts (704). For instance, a first application on the computer system may request a compatible second application on the device to provide an identification of its user, which may match the identification information of the other user that the user has indicated to the first application that the user trusts the other user, devices associated with the other user, or a specific device associated with the other user. In relation to identifying the device as being associated with the other user, the computer system may send a message to the device, where the sender of the message is attributable to the user of the system, a recipient of the message is attributable to yet another user, but does not include the other user (706).

Figure 8:
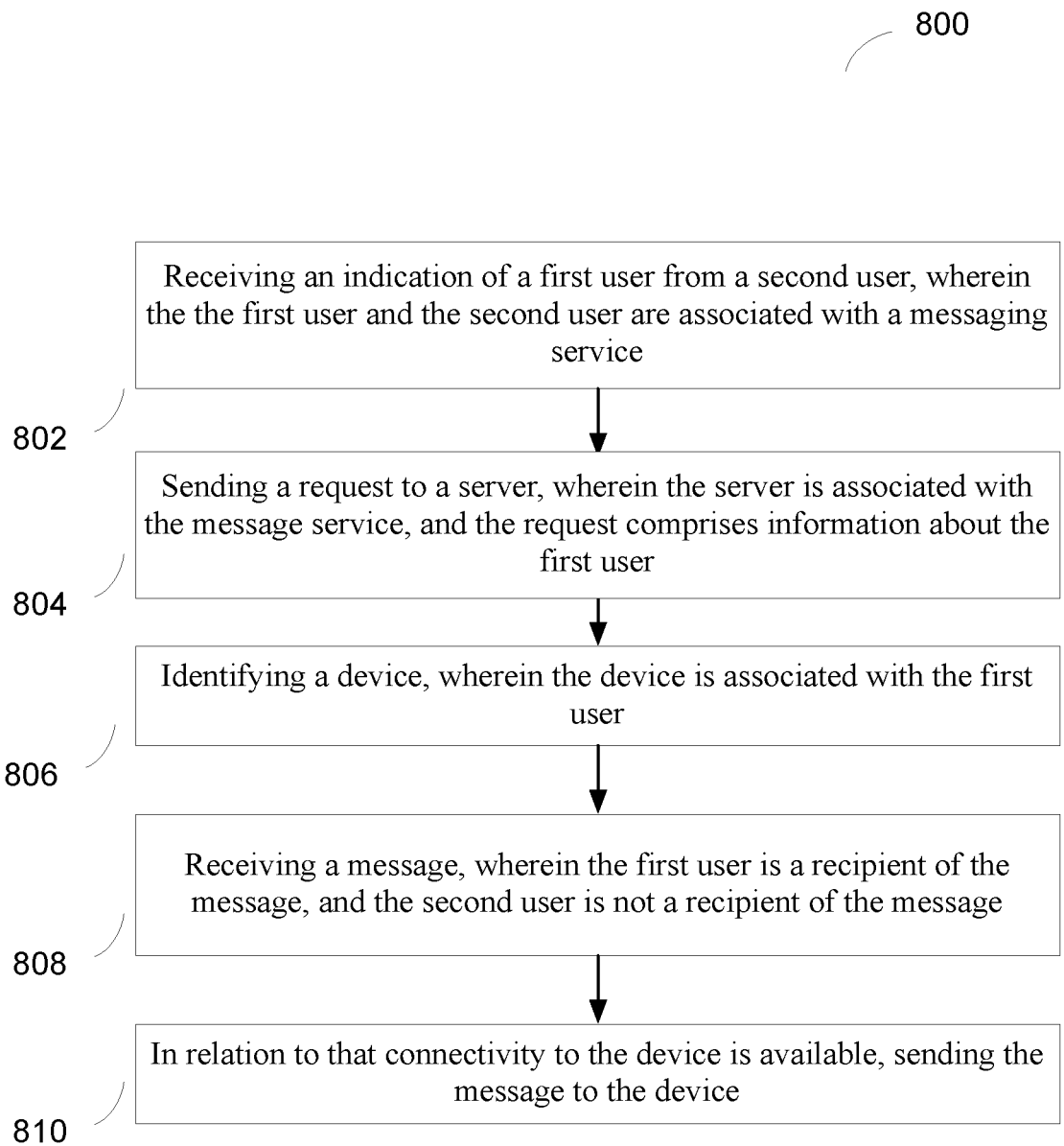
FIG. 8 shows a sixth computerized method in accordance with an embodiment.

In one embodiment, a message-relaying device may detect a message-relayed device or a device that is requesting to have another device to relay its messages. For instance, in one embodiment, FIG. 8 shows a flow diagram of an exemplary process 800 for receiving a message on behalf of another device where the message is addressed to a user on the other device. A computer system may be configured with executable instructions and may comprise a device local to a user, such as a mobile phone, and/or a device non-local to a user, such as another mobile phone local to another user. Per the example process 800, the computer system may receive an indication of a first user from a second user, where both users have an individual account with a common messaging service (802). For example, the computer system may be local to the second user. It may receive from another device a request to use an application on the computer system to relay messages, where the request identifies the first user making the request or otherwise being associated with the other device. The second user may then decide to accept this request based on the identity of the first user, and indicate to the computer system as such. In one embodiment, the computer system may then send a request to a server associated with the message service, where the request identifies the first user whose messages are acceptable to devices associated with the second user for relaying (804). The computer system may also identify the other device associated with the first user for purposes of receiving from the messaging service the future messages addressed to the first user and sending to the messaging service the incoming messages whose sender is attributable to the first user (806). For instance, the computer system may receive a message addressed to the first user but whose recipient does not include the second user (808). In relation to that connectivity to the other device (e.g., one that is local to the first user and has the first user authenticated) is available, the computer system may send the message to the other device (810), for example, for presentation to the second user. In one embodiment, should connectivity to the other device be unavailable, the computer system may store the message. It may then send the message to the other device when such connectivity is available.

Figure 9:
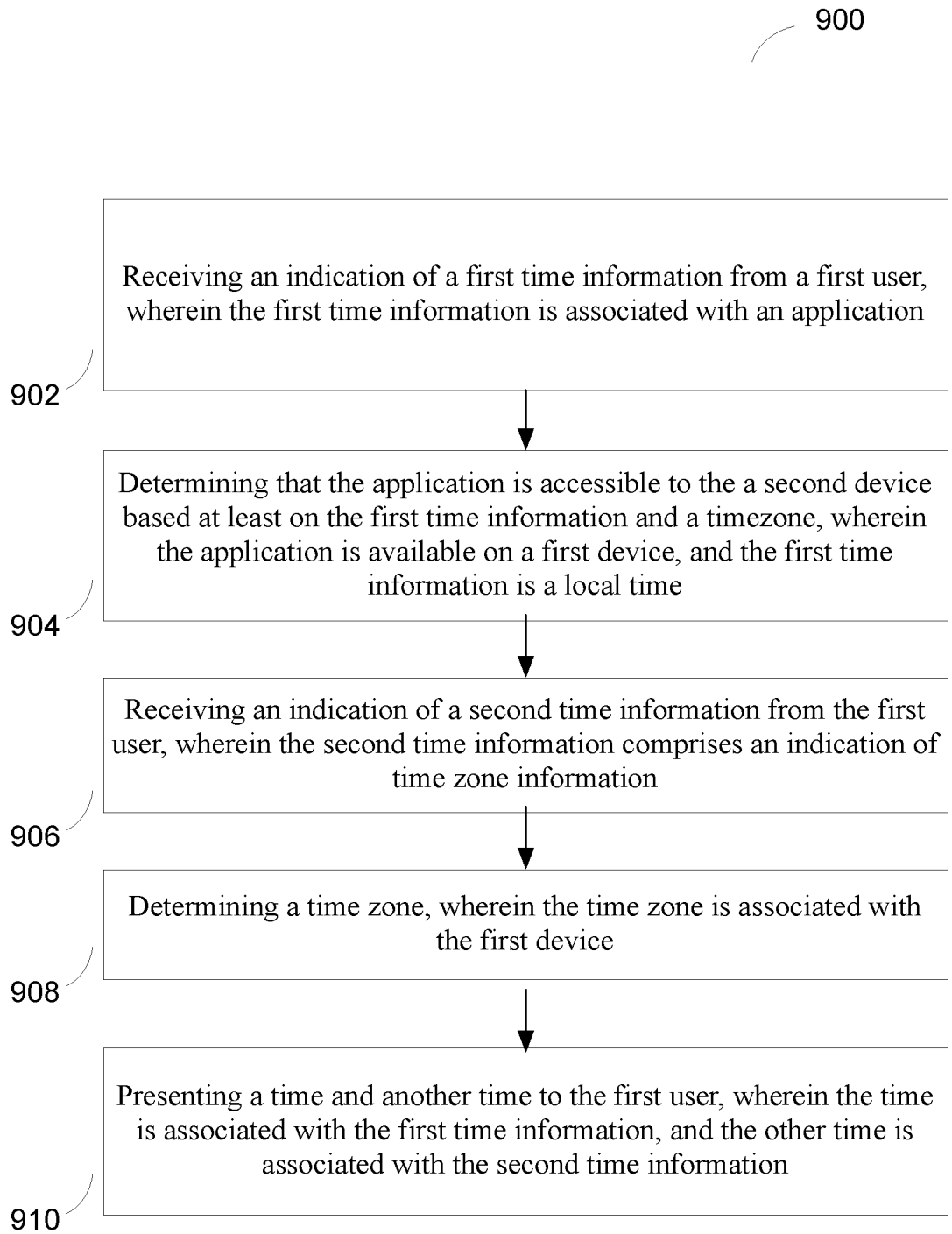
FIG. 9 shows a seventh computerized method in accordance with an embodiment.

The access to a relaying device associated with a user by a relayed device associated with another user may also be controlled or otherwise managed based on time information, e.g., time of day, a time range, a calendar time, or a combination thereof. FIG. 9 shows a flow diagram of an exemplary process 900 for presenting time information based on a time zone-independent time in a time zone-aware context, where, for example, the process or the steps as described may be performed under the control of one or more computing systems, such as a calendar application on a mobile device. A computer system may be configured with executable instructions and may comprise a device local to a user, such as a mobile phone, and/or a device non-local to a user, such as a messaging system. Per the example process 900, the computer system may receive an indication of a time information from a user (902), where, for example, the time information may comprise a time when the computer system or an application on the computer system is accessible to a device associated with another user.

The computer system may then determine that a corresponding application on the computer system is accessible to a device associated with another user based on the time information and a time zone (904). In one embodiment, the time zone may be associated with the current time zone of the computer system. In another embodiment, the time zone may be associated with the current time zone of the device. In one embodiment, the time information may be a local time pertaining to the computer system. In another embodiment, the time information may be a local time pertaining to the device. In one embodiment, the computer system may determine a time based on a time zone and the time information that is independent of a time zone (e.g., a local time), such that the time reflects the intended time of the time information in the time zone or the context of the time zone.

The computer system may also receive an indication of a second time information, for example, from the user, where the second time information comprises an indication of a time zone (906). For example, such a second time information may indicate when access to the device by the other device associated with the other user is to begin or to end. In one embodiment, the computer system may determine a time zone to interpret the first time information and/or the second time information (908). In one embodiment, such a time zone may be the current time zone of the computer system, the device, or the other device.

In relation to a time zone information, a first time information that is independent of a time zone, and a second time information that is specific to a time zone, the computer system may present to the user, e.g., via a schedule, calendar, or time table, an indication, e.g., a view, of a time and another time (910). For instance, in one embodiment, the time may be determined based on the first time information and the time zone information and the other time may be determined based on the second time information and the time zone, where both the time and the other time are presented correctly in relation to each other and in accordance with the time zone.

Figure 10:
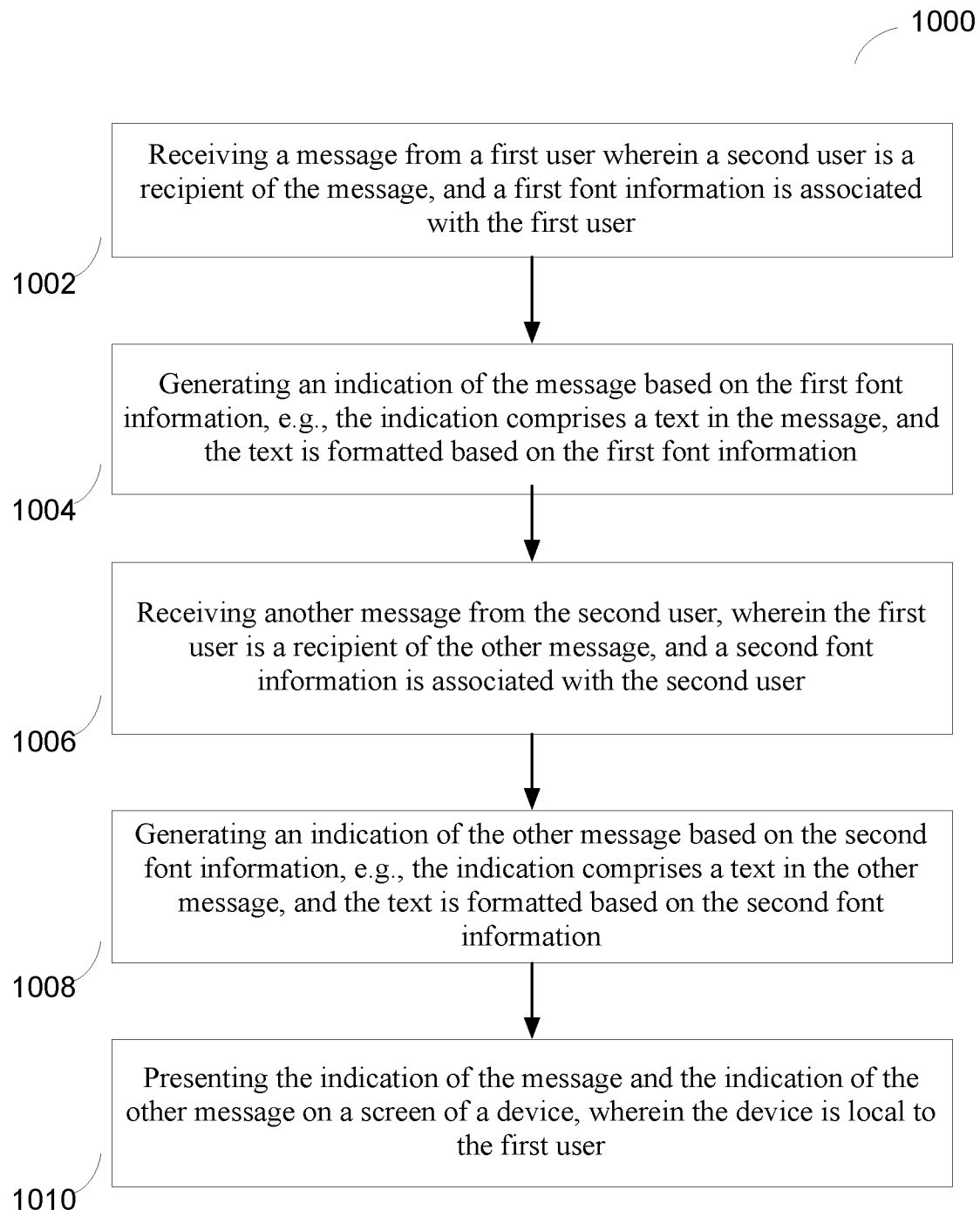
FIG. 10 shows an eighth computerized method in accordance with an embodiment.

The identity of a user of a message-relayed device or a message-relayed application on a device may also be indicated with a personalized font for text information in a message. FIG. 10 shows a flow diagram of an exemplary process 1000 for generating and/or presenting a message based on font information that is specific to a sender of the message, where, for example, the process or the steps as described may be performed under the control of one or more computing systems, such as a messaging application on a mobile device. A computer system may be configured with executable instructions and may comprise a device local to a user, such as a mobile phone, and/or a device non-local to a user, such as a messaging system. Per the example process 1000, the computer system may receive a message whose sender is attributed to a first user and whose recipients include a second user, where a first font information, e.g., Helvetica, is associated with the first user (1002). In one embodiment, such a font information may contain a font that corresponds to the handwriting of the first user. In another embodiment, the first font information and its association with the first user may be maintained at a device associated with the second user, the device having received the message. In one embodiment, the message may comprise the first font information, or a device associated with the second user may receive an indication of a message, where the indication may include the first font information. In relation to receiving the message, the computer system may generate an indication of the message based on the first font information (1004). For example, a text in the message may be formatted in accordance with the first font information.

Likewise, the computer system may receive another message whose sender is attributed to the second user and whose recipients include the first user, where a second font information, e.g., Arial, is associated with the second user (1006). In relation to receiving the other message, the computer system may generate an indication of the other message based on the second font information (1008). For example, a text in the other message may be formatted in accordance with the second font information.

In relation to the two indications each comprising a message from a different user, the computer system may present them to a user via a device screen (1010), where, for example, the two messages are displayed in two different fonts, each being associated with its respective user.

As indicated earlier, the embodiments discussed herein are illustrative of the present invention. The various procedures described herein may be implemented with hardware or software, or a combination of both. The invention may be implemented with non-transitory computer-readable storage media and/or computer-readable communication media. Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of any applicable claim.

What is claimed is:

1. A method, by one or more computer systems, comprising:
   receiving one or more indications from at least one user from among a first user and a second user, wherein the one or more indications result in authorizing one or more devices associated with the first user to relay messages to one or more devices associated with the second user;
   receiving a message whose intended recipient is the second user, wherein the first user is neither a recipient nor an originator of the message; and
   sending the message to a device in relation to an association between the first user and the second user, wherein the association is established in relation to receiving the one or more indications, the device is determined in relation to the association, and the device is associated with and movable by the first user.

2. The method of claim 1, further comprising:
   wherein the one or more indications comprise an indication from the first user, and the indication comprises identification of the second user; and
   wherein sending the message to the device associated with the first user comprises sending the message to the device associated with the first user, wherein the device sends the message to a destination device, the destination device being associated with the second user.

3. The method of claim 2, wherein the device associated with the first user receives the message independently of distance between the device and the destination device.

4. The method of claim 2, wherein the device associated with the first user receives the message independently of network between the device and the destination device.

5. The method of claim 1, further comprising:
   associating in one or more databases the second user with the first user prior to receiving the message.

6. The method of claim 5, further comprising:
   wherein the device is local to the first user; and
   wherein the device is determined by a system in relation to the association between the first user and the second user, and the system is non-local to the first user.

7. The method of claim 5, wherein associating the second user with the first user comprises associating a first user account with a second user account, wherein the first user account is associated with the first user, and the second user account is associated with the second user.

8. The method of claim 1, further comprising:
   determining the device from among the one or more devices associated with the first user in relation to the association between the first user and the second user.

9. The method of claim 1, further comprising:
   associating a first user account with a second user account independently of the message, wherein the first user account is associated with the first user, and the second user account is associated with the second user;
   determining the device from among the one or more devices associated with the first user;
   wherein sending the message to the device associated with the first user comprises sending the message to the device associated with the first user, wherein the device sends the message to a destination device, the destination device being associated with the second user; and
   wherein the message comprises data or information.

10. The method of claim 2, further comprising:
    wherein the message is accessible via a server; and
    determining that the destination device is not communicatively connected to the server.

11. The method of claim 2, wherein a user identity is associated with the identification of the second user, and the user identity is known to the first user.

12. One or more non-transitory computer-readable storage media bearing computer-readable instructions that, when executed on one or more computer systems, cause the one or more computer systems to perform operations comprising:
    receiving one or more requests from at least one user from among a first user and a second user;
    associating in one or more databases the second user with a user account in relation to the one or more requests, wherein the user account is associated with the first user;
    receiving a message whose intended recipient is the second user, wherein the first user is neither a recipient nor an originator of the message; and
    sending the message to a device in relation to an association in the one or more databases between the first user and the second user, wherein the device is determined in relation to the association, the device is movable by the first user, and the device is associated with the user account.

13. The one or more non-transitory computer-readable storage media of claim 12, further bearing computer-readable instructions that, when executed on the one or more computer systems, cause the one or more computer systems to perform operations comprising:
    causing another device to receive the message from the device, wherein the other device is associated with the second user.

14. The one or more non-transitory computer-readable storage media of claim 13, further comprising:
    wherein the message is accessible via a server; and
    determining that the other device is not communicatively connected to the server.

15. The one or more non-transitory computer-readable storage media of claim 13, wherein the device receives the message while the device is not communicatively connected to the other device, and the device sends the message in relation to determining that the device is communicatively connected to the other device.

16. A system comprising:
    one or more processors; and
    one or more memories communicatively coupled to the one or more processors when the system is operational, the one or more memories bearing computer-readable instructions that, when executed by the one or more processors, cause the system at least to:

receive one or more requests from at least one user from among a first user and a second user;

receive a message whose intended recipient is the second user, wherein the first user is neither a recipient nor an originator of the message; and send the message to a device in relation to an association between the first user and the second user, wherein the association is established in relation to receiving the one or more requests, the device is determined in relation to the association, and the device is associated with and movable by the first user.

17. The system of claim 16, wherein the one or more memories further bear computer-readable instructions that, when executed by the one or more processors, cause the system at least to:

store the message in one or more databases; and determine that another device is not communicatively connected to a server, wherein the one or more databases are accessible to the server, and the other device is associated with the second user.

18. The system of claim 16, wherein the one or more memories further bear computer-readable instructions that, when executed by the one or more processors, cause the system at least to:

associate in one or more databases the second user with a user account prior to receiving the message, wherein the user account is associated with the first user.

19. The system of claim 16, wherein the one or more memories further bear computer-readable instructions that, when executed by the one or more processors, cause the system at least to:

determine the device from among one or more devices in relation to the association between the first user and the second user, wherein the one or more devices are associated with the user account.

20. The system of claim 16, wherein the one or more memories further bear computer-readable instructions that, when executed by the one or more processors, cause the system at least to:

associate in one or more databases the second user with the first user independently of the message; and determine the device from among one or more devices in relation to the association between the first user and the second user, wherein the one or more devices are associated with the first user.

* * * * *